No. 743,813. PATENTED NOV. 10, 1903.
R. R. BOYD.
APPARATUS FOR TREATING COTTON WASTE.
APPLICATION FILED JULY 5, 1902.
NO MODEL.
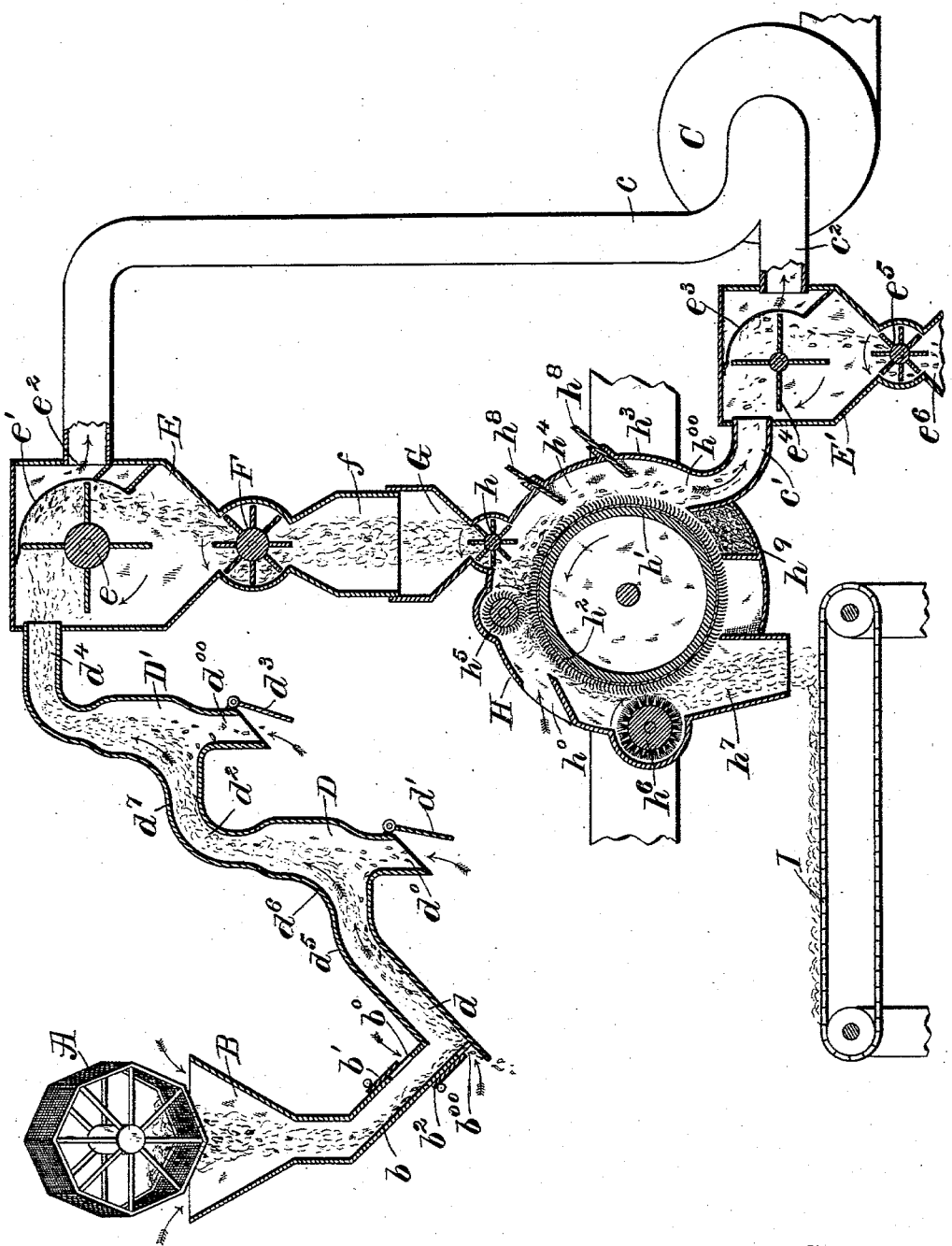
Witnesses
John H. Holt.
Gustav R. Thompson.
Inventor
Robert R. Boyd.
by Wilkinson & Fisher.
Attorneys.

No. 743,813. Patented November 10, 1903.

UNITED STATES PATENT OFFICE.

ROBERT R. BOYD, OF MEMPHIS, TENNESSEE.

APPARATUS FOR TREATING COTTON-WASTE.

SPECIFICATION forming part of Letters Patent No. 743,813, dated November 10, 1903.

Application filed July 5, 1902. Serial No. 114,531. (No model.)

*To all whom it may concern:*

Be it known that I, ROBERT R. BOYD, a citizen of the United States, residing at Memphis, in the county of Shelby and State of Tennessee, have invented certain new and useful Improvements in Apparatus for Treating Cotton-Waste; and I do hereby declare the following to be a full, clear, and exact description of the invention, such as will enable others skilled in the art to which it appertains to make and use the same.

My present invention relates to improvements in apparatus for treating trashy seed-cotton, especially boll-screenings—such, for example, as are discharged from the separator-screen of a cotton-seed-oil mill—and for separating the dried bolls from cotton, such as is gathered from the field in the bolls, as cotton killed by frost or that left in the field after picking, and is designed especially for use in carrying out my improved process for treating trashy cotton, which consists, briefly, in separating the foreign matter from the cotton and saving the latter in a condition for commercial use, said process forming the subject of an application of even date herewith.

To this end my said invention consists in the construction and combination of parts hereinafter more particularly described, claimed, and shown in the accompanying drawing, which represents the apparatus in sectional elevation.

A represents the separator-screen of a cotton-seed-oil mill discharging from its end the cotton-waste to be treated. This waste, usually comprising seed-cotton, chips of wood, nails, boll-hulls, small stones, dirt, dust, and other bodies composing the sweepings of cotton-oil mills and gins, falls into a hopper B. The lower end of this hopper opens into a chute $b$, inclined at the proper angle to allow the waste to slide through it. This chute is tubular and may be of any desired cross-section—rectangular, round, or otherwise—and is provided with two openings $b^0$ and $b^{00}$, the said openings being provided with sliding covers or doors $b'$ and $b^2$, respectively, though it may have other openings, if desired. The lower end of the chute $b$ connects with and opens into the lower end of the tubular chute $d$, extending upward and forming with the chute $b$ a V-shaped duct, through which the waste is conveyed by means of an air-draft created by a rotary fan C and entering the said duct through the hopper and openings $b^0$ and $b^{00}$. The opening $b^{00}$, located at the apex of the V, affords an exit for all heavy bodies which will not ascend through the duct with the air-draft.

At about the point $d^5$ the chute $d$ is curved in a horizontal direction and there forms an entrance-neck for an expansion-chamber D. The chute $d$ may be made integral with the expansion-chamber, as shown, or made in joints, as is obvious, the said chamber and chute being preferably of galvanized sheet-iron.

The chamber D comprises an enlarged body portion having its side in which the entrance-opening is located making with the neck $d^5$ a gradual curve $d^6$, so that the waste and current of air passing through the chamber, as hereinafter described, will be deflected to a sufficient extent to rid the waste of certain heavy particles, but not enough to greatly impede the course of the draft. In the bottom of the chamber D is formed an outlet $d^0$, rather contracted with respect to the body of the chamber, the contraction of the chamber into the said outlet being, however, by easy curves, so as not to form ledges within the chamber upon which the waste would find lodgment. This outlet $d^0$ is provided with a swinging door $d'$ or other adjustable cover which limits the size of the outlet. Through this outlet fall all heavy foreign particles which will not ascend through the chamber with the air-draft.

The upper end of the chamber D is contracted by easy curves into a neck $d^2$, which in the drawing is shown bent or curved into a plane at right angles to the vertical axis of the chamber D, though it is not necessarily bent in this exact course.

The action of the air in effecting the separation of the heavier particles in the chamber is as follows: The air entering the chamber D from the chute $d$ is directed first in an approximately horizontal direction and then turns upward. By virtue of their greater weight certain bodies contained in the waste will, owing partly to their inertia and partly to gravity, refuse to rise with the air in its upward course, but will continue to travel in the horizontal direction, which will cause them to ultimately fall into the opening $d^0$. Some of these bodies, however, will attempt to rise with the air and will be thrown out into the body of the chamber; but here the air, owing to the fact that it expands in the chamber D, will have reduced its velocity in that portion of the chamber into which the bodies are thrown and will therefore be incapable of raising the said bodies with it, which will then fall into the opening $d^0$. Again, there will be a centrifugal action as the current of air sweeps around the curve $d^6$ which will tend to throw heavy foreign particles into the body of the chamber, when they will fall into the outlet $d^0$. Moreover, owing to the fact that the outlet-neck $d^2$ is contracted relative to the body of the chamber the air will meet with sufficient resistance in entering said outlet to impede its progress, and thereby assist in the process of separation of the comparatively heavy bodies. So it will be seen that there are in reality four actions taking place in the separating-chamber tending to separate the heavy particles from the lighter—centrifugal force, expansion of the air, the inertia of the heavy bodies or their tendency to continue in the direction in which they enter the chamber, and the impedance of the outlet.

The neck $d^2$ joins onto the entrance passage or neck $d^7$ of a second expansion-chamber D', similar in all essentials to the chamber D, being of the same general shape and having the discharge-opening $d^{00}$ and door $d^3$.

The enlarged body portion of the chamber D', like the chamber D, is contracted at its upper end by easy curves into a neck $d^4$, which is shown bent or curved into a plane at right angles to the vertical axis of the chamber D', though not necessarily confined to this exact direction. There may be as many of these expansion-chambers as desired, located in tiers, as shown. The chutes $b$ and $d$ and chambers D and D', together with their connecting-necks, may be considered as one continuous tube having means for changing the direction of the air-draft and intermittently impeding the flow thereof. The end of this neck $d^4$ opens into a vacuum-box E, having in its upper end a clearer $e$. This vacuum-box is provided with an opening $e^2$ on the opposite side from the inlet-tube $d^4$, and this opening connects with an air-duct $c$, which leads to a rotary fan C of any desired construction.

In the box E, interposed between the opening $e^2$ and the clearer $e$, is a screen $e'$, preferably of wire and so located with respect to the said clearer that the wings thereof will remove the cotton from the screen. Through this screen is drawn the bulk of the dust and finer particles, which finds an outlet through the air-duct $c$.

The draft or suction created by the rotary fan through the apparatus thus far described passes in the direction of the feathered arrows. The same result, however, may be accomplished by forcing the draft through from the other end of the apparatus by a blower; but I prefer the arrangement shown.

In the lower end of the vacuum-box E or duct connected thereto is an air-tight pocket-valve F, rotating in the direction of the arrow. The waste freed from dust and other small particles and cleared from the screen $e'$ is delivered by the valve $e$ to the valve F, which in turn feeds the material through a trunk $f$. Up to this point the waste has been well ridden of heavy bodies—such as nails, pieces of wood, stones, and the like—by the uplifting process carried on in the chutes and expansion-chambers and cleared of dust and the like by the screen $e'$; but these devices are not capable of adequately removing such light bodies as boll-hulls, small pieces of paper, dry leaves, string, and the like. For this reason I employ in connection with the above-described apparatus the separator H and its accessories, which are designed especially for the separation of such bodies as above mentioned. This separator H comprises a casing $h^3$, which incloses, among other parts, a rotating drum or cylinder $h'$, having its periphery covered with carding-cloth $h^2$ or its equivalent, such as sharpened teeth driven into the periphery of the cylinder and the like. A hopper G is mounted upon the casing and opens therethrough into a space $h^4$, which is left between the said cylinder and casing.

The trunk $f$ from the vacuum-chamber E leads into the upper end of the hopper G, its connection therewith being preferably by an air-tight joint. In the bottom of the hopper G, or where the casing $h^3$ opens into said hopper, is located an air-tight pocket-valve $h$, upon which the said material falls from the vacuum-chamber. In some cases I may dispense with the valve F when the valve $h$ is employed or may dispense with the valve $h$ when the valve F is employed. The space $h^4$ opens into an outlet-duct $h^{00}$, which is connected to an air duct or tube $c'$, leading to the vacuum-box E', the same in all essentials as the box E. From this box E' the air passes by way of the duct $c^2$ to the fan C, while the boll-hulls and other trash swept from the screen $e^3$ by the clearer $e^4$ fall to an air-tight pocket-valve $e^5$, from which they are discharged from the opening $e^6$. The air forming the draft or suction in the separator enters it through the opening $h^0$ and passes around through the space $h^4$, as indicated by the feathered arrows.

Between the air-entrance $h^0$ and the inlet-valve $h$ is located a doffing-roller $h^5$, adapted to rotate at a higher speed than the cylinder $h'$ and near enough thereto to doff the boll-hulls and the like from the cotton, but not near enough to pick up the cotton from the cylinder. This doffing-roller thus acts to throw the boll-hulls into the air-current, by which they are carried around through the passage $h^4$ into the outlet $h^{00}$. The air entering the opening $h^0$ and passing in the direction shown will carry back past the doffer any loose boll-hulls which have made their way toward said opening. The cotton is then stripped from the carding by a rapidly-rotating stripping-brush $h^6$, located below the opening $h^0$, but within the separator-casing, as shown. A trunk $h^7$, located below the brush $h^6$, receives the material stripped from the cylinder and delivers it to a moving apron I.

Adjustable deflectors $h^3$ are provided in the air-space $h^4$ for directing the air-draft more directly against the cylinder and for varying the resistance to the draft through the separator. I also provide against the possibility of an air-suction from the trunk $h^7$ over to the outlet-duct $h^{00}$ by extending the sides of the said trunk and duct into the separator, forming the shields $h^{10}$, between which I insert a cushion $h^9$, preferably of hair or its equivalent. The cotton thus deposited upon the moving apron I is well disintegrated, and any loose strings or the like which may have passed through the machine with the cotton may be readily removed by hand or in any other convenient manner.

Any convenient means may be employed for rotating the cylinder of the separator and the various clearers and pocket-valves. In the event that this apparatus is used in the treatment of gathered cotton or boll-cotton by itself, the hopper, chute $b$, and screen may be dispensed with and the cotton to be treated drawn directly into the chute $d$ from the floor or elsewhere.

Having thus fully described my said invention, it is obvious that the same is capable of many modifications and minor changes which may be made without departing from the spirit of my invention; but

What I claim, and desire to secure by Letters Patent of the United States, is—

1. In an apparatus for treating cotton-waste, means for passing two currents of air through parts of said apparatus and means for conducting the waste along with one of said currents whereby the heavier portions of the foreign matter are removed, and means for forcing the remainder of the waste against the second current of air whereby the other and lighter foreign matter is removed, substantially as described.

2. In an apparatus for treating cotton-waste, an upwardly-extending tube and means for creating an air-draft therethrough in an upward direction, means for feeding the waste into said tube, means for changing the course of the air-draft in said tube and for impeding the flow of the air at or near such points, the said tube being also provided with discharge-openings at such points, whereby the heavy particles contained in the waste are separated therefrom, and means for separating from the cotton the remaining lighter particles and dust, substantially as described.

3. In an apparatus for treating cotton-waste, an upwardly-extending tube and means for creating an upward flow of air therethrough, means located in said tube for gravitating the heavier bodies from said waste, a vacuum-box into which said tube leads, an opening in said box opposite said tube, a screen interposed between said opening and said tube, an air-duct leading into said opening, a fan connected to said air-duct, means for removing the cotton from said screen, and means for separating the remaining foreign bodies from said cotton, substantially as described.

4. In an apparatus for treating cotton-waste, the combination with an inclined chute, of an upwardly-extending chute or tube connected at its lower end to the lower end of the first-mentioned chute, an expansion-chamber connected to the said upwardly-extending tube, said chamber having a discharge-opening in its bottom, and the tube connected with said chamber having an opening in its lower end, a vacuum-box communicating with said upwardly-extending tube and chamber, a pocket-valve located in said box, means for creating a forced draft upward through said tube and chamber and through said vacuum-box, means for discharging the cotton-waste from said box, and means for feeding it against a current of air whereby light particles are removed therefrom substantially as described.

5. In an apparatus for treating cotton-waste containing boll-hulls and other particles, the combination with a chute into which the waste is deposited, of an upwardly-extending chute or tube connected at its lower end to the lower end of the first-mentioned chute, a series of expansion-chambers communicating with each other and with said upwardly-extending tube, said chambers having discharge-openings in their bottoms and the tube connected with them having an opening in its lower end, means for creating a forced draft upward through the said chute and its connected expansion-chambers, means for freeing the waste from dust after it leaves said chambers, and means for doffing the boll-hulls from the cotton in the presence of a current of air, substantially as described.

6. In an apparatus for treating cotton-seed waste containing boll-hulls or other particles, the combination with a chute into which the waste is deposited, of an upwardly-extending chute or tube connected at its lower end to the lower end of the first-mentioned chute, a series of expansion-chambers communicating with each other and with said upwardly-extending tube, said chambers having discharge-openings in their bottoms and the tube connected with them having an opening in its lower end, a vacuum-box communicating with the last expansion-chamber in the series, a pocket-valve located in said box, an air-duct tube connected to said box, means for creating a forced draft through said tube, box-chambers and chute, a screen interposed between said pocket-valve and the said air-duct, means for discharging the cotton from said box, and a separator receiving said waste and comprising means for doffing boll-hulls from the waste and feeding it against a current of air whereby said boll-hulls and light particles are removed therefrom, substantially as described.

7. In an apparatus for treating cotton-waste containing boll-hulls or other particles, the combination with a chute into which the waste is deposited, of an upwardly-extending chute or tube connected at its lower end to the lower end of the first-mentioned chute, a series of expansion-chambers arranged in tiers, communicating with each other and with said upwardly-extending tube, said chambers having discharge-openings in their bottoms and said tube connecting with said chambers having an opening in its lower end, a vacuum-box communicating with the last expansion-chamber in the series, a pocket-valve located in said box, a rotary fan, an air-duct in connection with said pocket-valve, and the said air-duct, means for discharging the cotton-waste from said box, and a separator comprising means for doffing the boll-hulls from the cotton and feeding the waste against a current of air whereby the said boll-hulls and light particles are removed therefrom, substantially as described.

8. In an apparatus for treating cotton-waste containing boll-hulls or other particles, the combination with a hopper into which the waste is deposited, of a chute leading downward from said hopper, an upwardly-extending chute or tube connected at its lower end to the lower end of the first-mentioned chute, a series of expansion-chambers arranged in tiers communicating with each other and with said upwardly-extending tube, said chambers having discharge-openings in their bottoms and said tube connected in its lower end, a vacuum-box communicating with the last expansion-chamber in the series, a pocket-valve located in said box, a rotary fan, an air-duct connecting said fan with said vacuum-box, a screen interposed between said pocket-valve and the said air-duct, means for discharging the cotton-waste from said box, and a separator comprising means for doffing the boll-hulls from the cotton and feeding the waste against a current of air whereby the said boll-hulls and light particles are removed therefrom, substantially as described.

9. In an apparatus for treating cotton-waste, an expansion separating-chamber, comprising an enlarged body portion having an inflow-duct passing into the lower end of said chamber and a contracted throat or exit-tube at the upper end of said chamber through which the cotton is forced to travel, substantially as described.

10. In an apparatus for treating cotton-waste, an expansion separating-chamber, comprising an enlarged body portion having an inflow-duct passing into the lower end of said chamber, a discharge-opening in the bottom of said chamber, means for varying the extent of the same, and a contracted throat or exit at the upper end of said chamber through which the cotton is forced to travel, substantially as described.

11. In an apparatus for treating cotton-waste, an expansion separating-chamber, comprising a substantially vertical body portion having an inflow-duct passing into the lower end thereof, the entrance of the upper portion of said duct into said chamber being by a gradual curve, a discharge-opening in the bottom of said chamber, and a contracted throat or outlet at the upper end of said chamber through which the cotton is forced to travel, substantially as described.

12. In an apparatus for treating cotton-waste, an expansion separating-chamber, comprising a substantially vertical body portion having an inflow-duct passing into the lower end thereof, the entrance of the upper portion of said duct into said chamber being by a gradual curve, a discharge-opening in the bottom of said chamber, an adjustable cover therefor, and a contracted throat or outlet at the upper end of said chamber through which the cotton is forced to travel, substantially as described.

13. In an apparatus for treating cotton-waste containing boll-hulls or other particles, the combination with a series of expansion-chambers, of a vacuum-box connected therewith, means for creating an air-current through said chambers and said box, a separator receiving the waste from said box and comprising an inclosed rotating drum, teeth mounted upon the periphery of said drum, means for creating an air-current around the periphery of said drum in a direction opposite to its rotation, and means for brushing the cotton therefrom, substantially as described.

14. In an apparatus for treating cotton-waste containing boll-hulls or other particles, the combination with a series of expansion-chambers, of a vacuum-box connected therewith, means for creating an air-current through said chambers and said box, a separator receiving the waste from said box and comprising an inclosed rotating drum, teeth mounted upon the periphery of said drum, means for creating an air-current around the periphery of said drum in a direction opposite to its rotation, means for doffing the boll-hulls from said cotton, and means for brushing the cotton from the said drum, substantially as described.

15. In an apparatus for treating cotton-waste containing boll-hulls or other particles, the combination with means for creating a forced draft through a part of the apparatus and forcing the waste along this air-draft in the direction thereof, means for blowing the dust out of the waste, and means for separating the lighter particles from said waste, comprising a rotary drum, a casing inclosing said drum and forming an air-channel around the periphery thereof, means for creating a forced air-draft through said air-space in a direction opposite to the rotation of said drum, means for delivering the waste onto said drum through said air-draft, means for doffing the boll-hulls from the cotton upon said drum, means for stripping the remaining cotton from said drum and delivering it from said separator, substantially as described.

16. In an apparatus for treating cotton-waste containing boll-hulls or other particles, the combination with means for creating a forced draft through a part of the apparatus and forcing the waste along this air-draft in the direction thereof, means for blowing the dust out of the waste, and means for separating the lighter particles from said waste comprising a rotary drum having a roughened periphery, a casing inclosing said drum and forming an air-channel around the periphery thereof, means for creating a forced air-draft through said air-space in a direction opposite to the rotation of said drum, means for delivering the waste onto said drum through said air-draft, a doffer located within said casing and doffing the boll-hulls from said drum, a rotating brush also within said casing and adapted to strip the remaining cotton from the said drum and means for delivering the said cotton from said separator, substantially as described.

In testimony whereof I affix my signature in presence of two witnesses.

ROBERT R. BOYD.

Witnesses:
FRANK D. BLACKISTONE,
JOHN H. HOLT.